(12) United States Patent
Miñano et al.

(10) Patent No.: US 9,360,675 B2
(45) Date of Patent: Jun. 7, 2016

(54) OPTICAL PHASE SPACE COMBINER

(71) Applicant: LIGHT PRESCRIPTIONS INNOVATORS, LLC, Altadena, CA (US)

(72) Inventors: Juan Carlos Miñano, Madrid (ES); Pablo Benitez, Madrid (ES)

(73) Assignee: Light Prescriptions Innovators, LLC, Altadena, CA (US)

(*) Notice: Subject to any disclaimer, the term of this patent is extended or adjusted under 35 U.S.C. 154(b) by 181 days.

(21) Appl. No.: 13/678,034

(22) Filed: Nov. 15, 2012

(65) Prior Publication Data

US 2013/0120849 A1  May 16, 2013

Related U.S. Application Data

(60) Provisional application No. 61/629,253, filed on Nov. 16, 2011.

(51) Int. Cl.
*G02B 27/14* (2006.01)
*G02B 19/00* (2006.01)

(52) U.S. Cl.
CPC .......... *G02B 27/14* (2013.01); *G02B 19/0028* (2013.01); *G02B 19/0066* (2013.01)

(58) Field of Classification Search
CPC .......... G02B 19/0028; G02B 17/086; G02B 3/0056; G02B 27/0977; B42D 2035/20
USPC ......... 359/546, 618–629, 634–640, 871, 883, 359/884, 443, 454, 455, 13–14; 385/14, 15, 385/24, 27, 31, 33, 36, 50
See application file for complete search history.

(56) References Cited

U.S. PATENT DOCUMENTS

| | | | | |
|---|---|---|---|---|
| 5,270,859 A | * | 12/1993 | Wirth | G02B 3/0062 359/419 |
| 2001/0033422 A1 | * | 10/2001 | Miura | G02B 3/0068 359/621 |

(Continued)

FOREIGN PATENT DOCUMENTS

| | | |
|---|---|---|
| JP | 2004-221042 A | 8/2004 |
| WO | 99-11498 | 3/1999 |

(Continued)

OTHER PUBLICATIONS

International Search Report, dated Mar. 28, 2013, 9 pages.

*Primary Examiner* — Bumsuk Won
*Assistant Examiner* — Tamara Y Washington
(74) *Attorney, Agent, or Firm* — Drinker Biddle & Reath LLP

(57) ABSTRACT

An optical component called the Phase Space Combiner (PSC) is designed to join several bundles of rays. The bundles of rays, when represented in ray phase-space, occupy non-connected regions before passing through the PSC, while their representation in ray phase space occupies a single simply connected region (without holes) after passing through the PSC. Obviously, when used in reverse way it splits one bundle in several parts. We present herein the idea of using Multiple Individual Optics, MIO, not for collimating the light from the LEDs but as a PSC. Then a Single Common Optics, SCO, which can be an optical train, is used to get the desired intensity pattern. This hybrid SCO and MIO strategy combines most of the advantages of both approaches.

15 Claims, 6 Drawing Sheets

300

(56) References Cited

U.S. PATENT DOCUMENTS

2006/0279845 A1* 12/2006 Gurevich ............ G02B 3/0056 359/622
2011/0069474 A1   3/2011  Xu et al.
2012/0120647 A1   5/2012  Li
2013/0057786 A1*  3/2013  Watson ............ G03B 21/2033 349/5

FOREIGN PATENT DOCUMENTS

WO    2008-008994    1/2008
WO    2011-011980    2/2011

* cited by examiner

OPTICAL PHASE SPACE COMBINER

CROSS REFERENCE TO RELATED APPLICATION

This application claims benefit of U.S. Provisional Patent Application No. 61/629,253, filed Nov. 16, 2011 by Miñano et al. for "Optical Phase Space Combiner." References are made to commonly owned U.S. Pat. No. 7,286,296 B2 titled "Optical Manifold For Light-Emitting Diodes" by Chaves et al., to U.S. Pat. No. 8,000,018 B2 titled "Kohler Concentrator" by Benitez et al, and to U.S. Patent Application Publication No. 2008/0316761 A1 titled "Free-Form Lenticular Optical Elements and Their Application to Condensers and Headlamps" by Miñano et al. These applications, which have at least one common inventor to the present application, are incorporated herein by reference in their entirety.

BACKGROUND OF THE INVENTION

In solid state illumination, when high brightness together with high flux, or when high brightness together with color tuning, are required, the only possibility is to use several high brightness LEDs (HBLEDs), or multi-chip LED packages. In general, the optics problem consists of transmitting the light emitted by the LEDs to a target with a prescribed irradiance pattern. When high brightness is desired in illumination, it is because of the need to achieve reasonably sized optical systems (maximum intensity of a system is upper bounded by the product of the highest brightness of the LEDs times the optical aperture area). In general, the luminaires' emission angle is small in high brightness applications, which implies that the optical system aperture size is relatively large. There are two basic strategies in designing a luminaire optical system for multi-LED systems:

Multiple Individual Optics (MIO): where every LED chip has its own individual optical system and all individual optical systems are identical, Single Common Optics (SCO), where there is a single optic collecting and processing the light from all the LEDs. This single optics needs the light from the multiple sources to be from a single connected region, otherwise the optics will send to the target high brightness rays mixed with low brightness rays, which results in a system which "dilutes" the brightness (and so increases its size). To be more precise, the single optics needs the light being carried by a ray bundle, when represented in ray phase space, to form a connected region. A simple way to get a single connected LED source is just to pack all the LED chips close together, as in a multi-chip LED package.

There are several aspects differentiating both strategies:

Thermal management: Because LED chips are tightly packed in the SCO strategy; heat extraction is much more difficult in this case than in the MIO strategy.

Electrical interconnections: The tight package of the SCO strategy makes electrical interconnections and chip electrical isolation more difficult than in the MIO strategy, although this may be a relatively small problem for some soldering technologies.

Volume of the optical system: The volume of the optical system is proportional to the third power of diameter of the emitting area (roughly speaking). In the MIO strategy, the emitting area of each chip is comparatively small. Assume that the diameter of a single LED is d and there are M LEDs. The volume of each individual optics in the MIO strategy is proportional to $d^3$ and so the total volume of optical parts grows as $M d^3$. In the SCO strategy the diameter of the chip array is proportional to $M^{1/2} d$ and so the volume of the optical system grows as $(M^{1/2} d)^3$, i.e. $M^{1/2}$ times faster than in the MIO strategy.

Optical system manufacturing and assembling: This is the weakest aspect of the MIO strategy because the emission angle in high brightness applications is usually small and so aiming the different optics towards the same direction becomes more difficult. This is not only because the number of optics to align becomes large, but also because the aiming angle error must be much smaller than the emission angle, which is already small.

Number of different optical parts. In general the number of different optical parts in the MIO strategy is much larger, unless all the different optical parts are manufactured in a fewer number of pieces, for instance injecting all the optics in a single piece. Nevertheless, injecting all the optics in a single piece may worsen the optical quality. This is because the corners around every individual optics cause warpage and uneven shrinkage leading to misalignment of the pieces as well as worsening the optical quality of the surfaces.

A hybrid strategy between SCO and MIO could reduce the number of chips per cluster but still have multiple optics (one per cluster). This strategy diminishes the pros of one option by increasing the pros of the other option.

The same idea presented here for LEDs is also applicable to Concentrating Photovoltaics (CPV). Most of the CPV systems use the MIO strategy, and a few of them (for instance Solar Systems) uses the SCO strategy (an array of solar cells as a receiver and a single optics for the whole array). The idea presented henceforth is also applicable to CPV.

SUMMARY OF THE INVENTION

The document describes an optical component designed to join several bundles of rays, which is called the Phase-space combiner (PSC). In this approach, the bundles of rays, when represented in ray phase-space, occupy non-connected regions before passing through the PSC, while their representation in ray phase space occupies a single connected region (in the best case without holes) after passing through the PSC. One test for a "single connected region" is that any ray in the region can be transformed smoothly into any other ray in the region with every intermediate position in the transformation also being a ray in the region. Obviously, when used in the reverse way it splits one bundle into several parts. We present herein the idea of using MIO not for collimating the light from the LEDs but as a PSC.

The PSC is in general intended to be used together with an additional optics whose light source is the output of the PSC. Because the lit rays exiting the PSC form a connected region in ray phase space, the output of the PSC can be considered as a single source from a design point of view. For this reason the additional optics can be considered as a SCO device.

This hybrid SCO and MIO strategy combines most of the advantages of both approaches. Advantages in thermal management and electrical interconnections are gained from the MIO approach, because of the gap between chips. Advantages in optical tolerances and less number of optical elements (excluding the PSC itself) are gained from the SCO approach. Unlike a MIO device for collimated beams, a PSC has a large emission angle and this allows, in general, for it to be manufactured in a single molded piece without optical misalignment and other assembling problems.

One embodiment of an optical system comprises an array of light sources, an array of optical components, each aligned with a respective one of the array of light sources, wherein the array of optical components acts as a phase space combiner for light from the array of light sources. The optical components are non-flowline optical components, and may be components wherein every light ray from one of the array of sources passing through the respective said optical component undergoes a maximum of one reflection at a reflective surface.

In an embodiment, the light rays from the array of sources passing through the respective said optical components do not undergo reflection at any reflective surface. The array of optical components may then be an array of lenses. The array of lenses may then substantially tile a surface, or the lenses may be partly separated. A regular tiling often gives the highest uniformity and intensity, but at the expense of some loss of efficiency.

The array of optical components may be formed at least in part by a transparent medium bounded on a side towards the array of light sources by an interface with a medium of lower refractive index, whereby light rays from the array of sources enter the array of optical components in directions limited by a critical angle of refraction at said interface. For example, the transparent medium may be a glass or plastic sheet with the critical angle surface facing the array of light sources across an air gap, and with lenses molded into the opposite surface.

The optical system may further comprise an optics receiving light from said phase space combiner and common to the optical components of said array. The common optics processes the light from the PSC as if the PSC were a single source, making possible an exceptionally uniform or homogenized light distribution downstream of the common optics.

Such a common optics may comprise a kaleidoscope, a Köhler integrator, or both.

The Köhler integrator may be an array of Köhler integrators. A Kohler integrator is a device in which a first optical element images a source onto a second optical element, and the second optical element images the first optical element onto a target. Each of the first and second optical elements may be an array, with a common source, each component of the first array imaging the source onto a respective component of the second array, and each component of the second array imaging the respective component of the first array onto a common target.

The array of Köhler integrators need not be aligned with the PSC array, and indeed it may be preferred to arrange that the two arrays are not aligned in a one-to-one or one-to-many relationship. The most uniform output may be obtained if the entire PSC is treated as a common source for the entire array of Köhler integrators. However, that may require either an inconveniently long optical train, or an impractically wide acceptance angle for the Köhler integrators. An arrangement in which each Köhler integrator of the array accepts light from only part of the PSC, and each optical component of the PSC illuminates only part of the array of Köhler integrators, may therefore be more practical.

The array of light sources or sinks may be an array of LEDs, photovoltaic chips, or other electro-optical elements.

Each source or sink may be positioned so that the light passes, without diffusion or reflection of its central ray, between the source or sink and the optical component. Each source or sink may be on an optical axis of a respective one of the array of optical components, or a minor amount of refractive deflection may be allowed. The collimation of the beam may be changed by a refractive surface between the source or sink and the optical component, such as the critical angle interface mentioned above, if that interface is not treated as forming part of the optical component.

Another embodiment of an optical system comprises a plurality of light sources, a Phase-space Combiner (PSC) that combines the disconnected ray bundles from the said light sources into a single connected ray bundle, and a Single Common Optics (SCO) comprising an optical element or a sequence of optical elements that processes the light from the said PSC.

The said PSC may be a lens array, and may comprise free-form lenses with non-constant pitch between lenses.

The system may comprise a kaleidoscope following the said PSC.

The SCO may comprise optical elements that are in Kohler integrator array configuration.

The PSC may be integrated into the primary optical element of the SCO.

In an embodiment, the plurality or array of light sources is a plurality or array of LEDs. The LED chips can then be placed spaced apart on a heat spreader and/or heat sink for heat management, and easily accessible for electrical connections, while still presenting to the consumer side the appearance of a single continuous source. The LED chip array placed on a heat spreader and heat sink together with the PSC optics become a generic LED light engine to be used either directly in applications not requiring collimation or in combination with another optical element for applications requiring medium to high collimation, such as street lighting, architectural illumination, or automotive applications. This LED light engine solves or simplifies optical and thermal designs for the luminaire designer and the luminaire manufacturer.

The additional optical element (which can be considered as a SCO device, as said before) may be, for example, a single reflector collimating the light coming from the PSC such that the luminaire has a small emission angle. This type of design has an intensity pattern which tends to replicate the illuminance pattern of the source (which in this case is the output of the PSC). Because this illuminance may not be constant, the luminaire intensity won't be constant either and may show undesirable artifacts, and if the source is composed of different colors, the intensity may show color inhomogeneities. A kaleidoscope immediately following the PSC and before the reflector, so that the kaleidoscope output is the light source of the reflector, can remove the artifacts and provide color mixing.

In general the kaleidoscope is not needed when the SCO contains a Kohler integrator array configuration as described in U.S. Pat. No. 8,000,018 B2 and U.S. Patent Application Publication No. 2008/0316761.

In general, there is a trade-off between average brightness and PSC efficiency. For instance, assume the PSC is a hexagonal array of rotational symmetric microlenses. There is an LED chip near the focus of every microlens. The chip emission does not intercept exactly its corresponding lens. This is because the chip emission gives a spot on the lens surface that is close to having rotational symmetry whereas the lens contour is hexagonal or square. Moreover, the brightness of the rays exiting the lens is not uniform even if the chip emission has constant brightness. This is because of the Fresnel losses associated with the air gap between chips and PSC are strongly dependent on the angle of incidence for large incidence angles. These losses are high for those rays that intercept the border of the lens. So in general we will have lower brightness for rays issuing from the border of a lens than for the rays issuing from its center, i.e., there will be a non-constant illuminance (lumens/m$^2$) at the output of the PSC. If we want high efficiency, then the lens has to collect all the light that the LED emits, i.e. the hexagonal contour of the lens must enclose the spot of light produced by the LED on the lens surface. In this case, the additional optical element (i.e., the SCO device following the PSC) will collect, and in general will mix all the rays coming from the PSC. Then, the average brightness will be diluted by the effect of the rays coming from the rim of the lens. A similar, but worse, situation is when the collection area of the lenses is smaller than the spot of the LEDs. In this case the phase space representation of the rays coming from the LEDs may not form a connected region. In general, an optical system placed at the output of the microlens array will collect and mix not only the rays coming from the LEDs but also some unlit rays whose phase space representation is near that of the LED rays, leading to a dilution of the average brightness.

If we want to achieve high brightness, then we have to reject the rays with low brightness, i.e., the microlens contour (in general an hexagon or a square) must be enclosed by the LED spot which means that the efficiency will decrease because some of the LED emission will go to adjacent lenses where its control is lost. Due to the trade-off between average brightness and PSC efficiency, the illuminance at the PSC exit aperture will in general not be constant. As was discussed, this may have undesirable consequences, which in some cases can be solved by adding a kaleidoscope element or using a Kohler integrator array configuration.

In the interests of simplicity, the optical systems are described mostly in terms of light from a plurality of sources being combined by the PSC into a single output beam. However, many of the optical systems described are equally applicable to a single input beam being split by the PSC into a plurality of part beams each focused on a respective light sink, such as a photovoltaic cell. Such light sink systems, as well as light source systems, are included in the present invention in its broadest sense.

BRIEF DESCRIPTION OF THE DRAWINGS

The above and other aspects, features and advantages of the present invention will be apparent from the following more particular description thereof, presented in conjunction with the following drawings wherein.

DETAILED DESCRIPTION OF THE PREFERRED EMBODIMENTS

A better understanding of various features and advantages of the present invention may be obtained by reference to the following detailed description of the invention and accompanying drawings, which set forth illustrative embodiments in which the principles of the invention are utilized.

Optics for combining several ray bundles into a single ray bundle has been designed with two different techniques.

Figure 1:
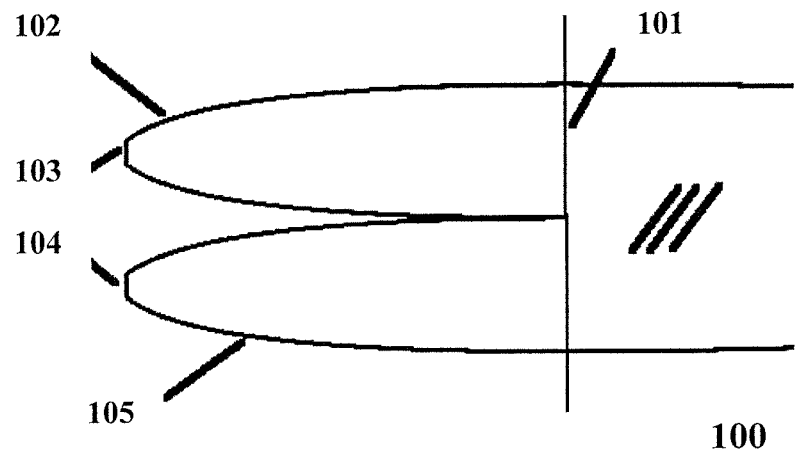
FIG. 1 shows a PSC of prior art, designed with the flow line method, for a 2-chip system.

FIG. 1 shows a phase space combiner (PSC) 100 of prior art designed with the flow-line method based on U.S. Pat. No. 7,286,296 B2. A "flow-line" is a line that at every point is tangent to the bisector of the angle formed by the edge rays of the rays from the source reaching that point after being modified by any structures that add or remove rays between the original source and the point of measurement. An "ortho-flowline" is a line that at every point is perpendicular to the flow-lines. The light from two sources 103 and 104 is combined to create a single bigger source using fiber-like optics 102 and 105 whose walls follow the flow-lines. Plane 101 is the plane at which two disconnected bundles are combined into one connected bundle. This type of design becomes very complex when the number of chips increases.

Figure 2:
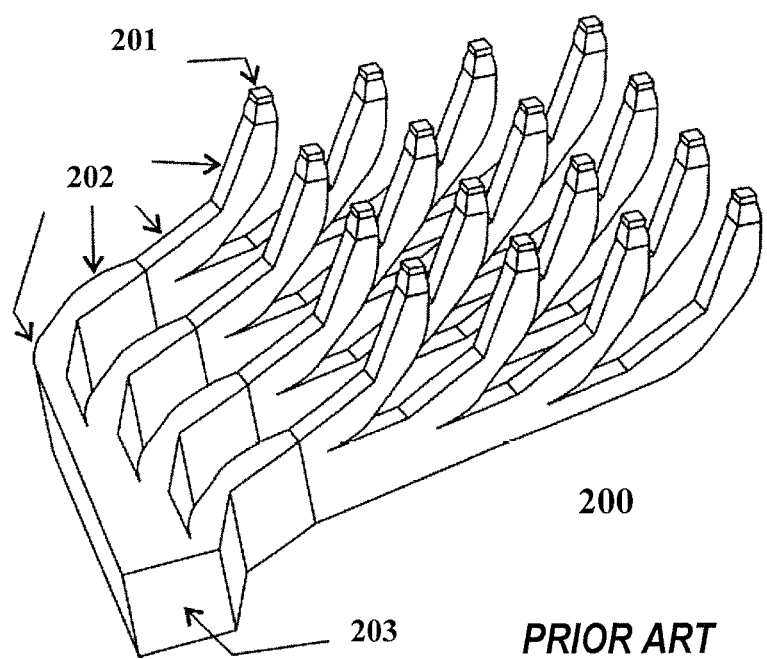
FIG. 2 shows a PSC of prior art, designed with the flow line method, for a 16-chip system.

FIG. 2 illustrates the complexity of a 16-chip PSC 200 of prior art from U.S. Pat. No. 7,286,296 B2 comprising of LEDs 201, angle rotators 202, and an exit surface 203. Besides this complexity, the flow-line designs have typically loses at the rim of the light guide in contact with the chip.

Figure 3:
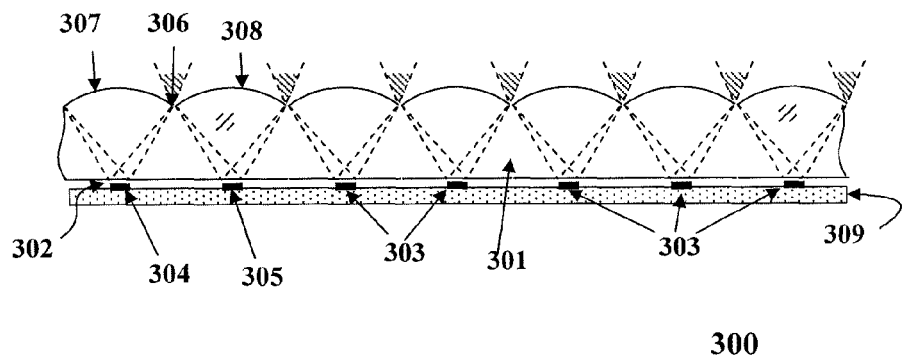
FIG. 3 shows a lens array PSC, manufactured on a single piece of dielectric, used to form a single connected bundle by joining the emission bundles of the LEDs.

FIG. 3 shows a lens array PSC 300 manufactured on a common dielectric substrate 301. In this case, the air gap 302 between the chips 303, 304 and 305 and the dielectric substrate helps to collimate the radiation inside the dielectric, because the light rays inside the dielectric are confined to a cone within the critical angle of refraction at the interface. This gap could be filled with a low refractive index material other than air. Without the lens array, the illumination bundle (that is the set of rays carrying power) is disconnected. This means that there are multiple gaps in the phase space representation of the rays coming from the different chips. When a properly designed lens array is used, the rays leaving the lens array form a single connected bundle. To achieve this connected bundle, rays exiting the array at a shared edge between adjacent lenses must give rise to the same (or similar) ray cone whether the rays are regarded as coming from one or the other chip of the adjacent lenses. For instance, the light rays emitted upwards near edge 306 must be in the same ray cone regardless whether the edge is considered to be part of the left lens 307 or part of the right lens 308. Note that if edge 306 is considered to be part of lens 307, these rays must come from chip 304, while if the edge belongs to lens 308, then these rays must come from chip 305.

Typically, the angular extent of a ray cone at a point on the exit surface of the PSC is quite large (in the range of 5-50 degrees or even greater) to minimize misalignment problems. In the case shown in FIG. 3, the angular extent of a ray cone at a point on the exit surface of the PSC is approximately independent of the location of the point on the exit surface. The collection of ray cones from all points on the exit surface of the PSC forms the ray bundle emitted by the PSC. This ray bundle is indistinguishable from a source at infinity with an angular size equal to that of a cone on the exit surface of the PSC.

Figure 8:
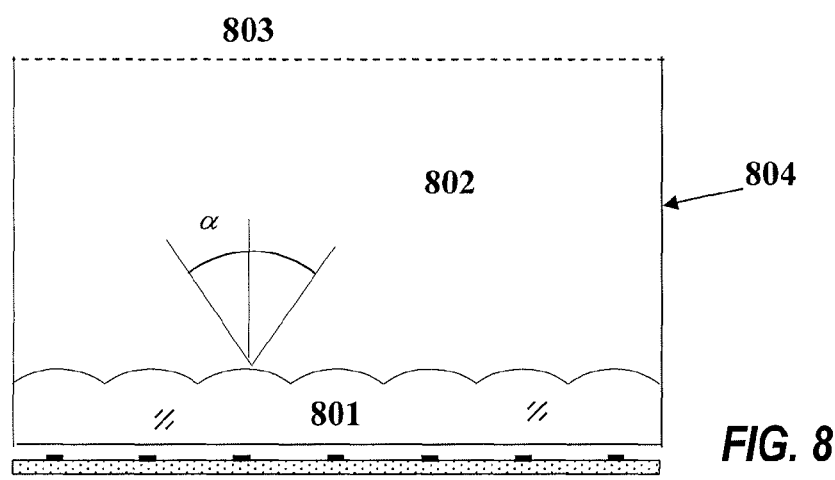
FIG. 8 shows a PSC followed by a kaleidoscope section.

Now, let us assume that this common emission cone has a circular base with a cone half angle of α (see FIG. 8). Let us call C, the ratio of the lens array area to the emitting area of the LEDs. This lens array area is almost coincident with the heat sink 309 area where the LEDs are placed. The heat density (W/m$^2$) is 1/C times the value of that when the chips are close together. From a thermal point of view, a high C is desirable. C is also related to the emission cone half angle α, where, approximately C≈1/sin$^2$ α. For instance, a cell pitch (distance between chip centers) equal to twice the chip side (each chip is assumed to be square), gives C=4 and α=±30 deg. This means that the heat density is decreased by a factor of 4 and the emission full angle becomes 60 deg. These numbers show the trade-off between emission angle and heat density as well as the wide range of solutions that are possible using this approach.

In general, the emission cones, at points on the aperture of the PSC, are not equal, nor do they have a circular base. This is because the lenses are in general free-form and the pitch not constant.

Figure 4:
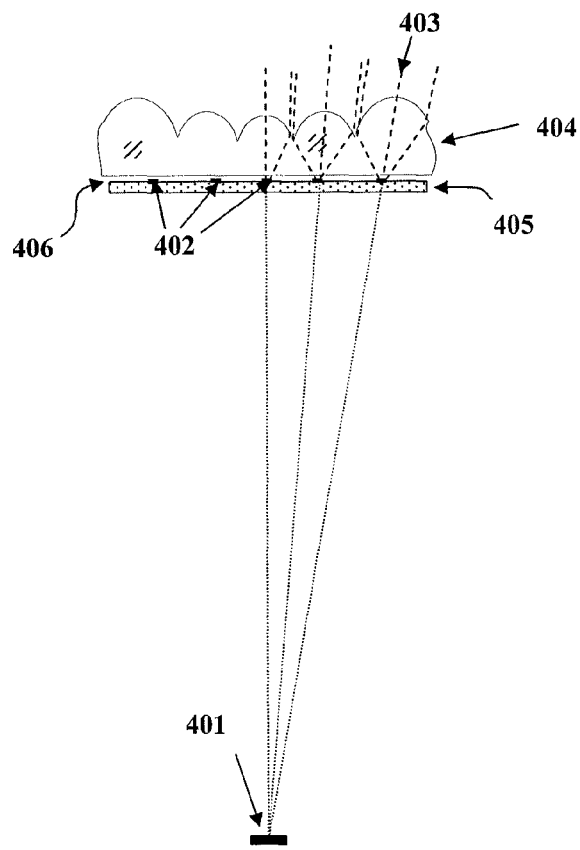
FIG. 4 shows a PSC, with free-form lenses and with non-constant pitch between the lenses, whose emission cones are indistinguishable from those of a virtual source at a finite distance.

FIG. 4 shows a PSC whose emission cones are indistinguishable from those of a virtual source at a finite distance. In other words, the light exiting the PSC comes as if from a virtual chip 401. In this PSC, the LEDs 402 are not equally spaced, and the lenses 403 are not all the same. The LED chips are mounted on a printed circuit board (PCB) that functions also as a heat spreader 405. There is an air gap 406 between the single piece of dielectric 404 of the lenses and the LEDs' emitting surfaces. Since the lenses are in general not the same, nor have rotational symmetry, the exit aperture cannot be covered by regular tiling.

Figure 5:
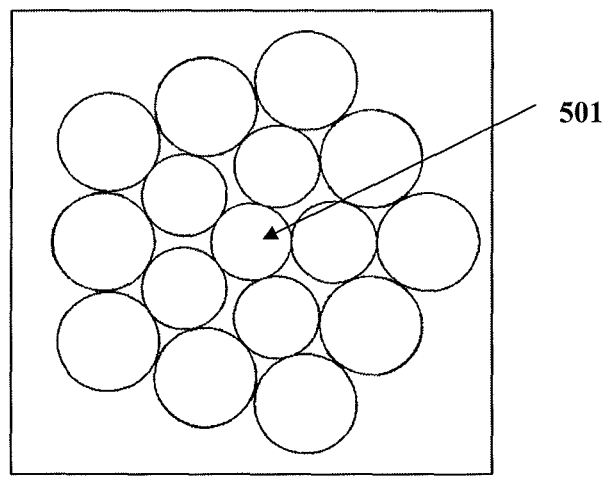
FIG. 5 shows a front view of the lens contours of a PSC similar to that of FIG. 4, but with the lenses separated for maximum efficiency.

FIG. 5 shows a front view of the lens contours of a PSC similar to that of FIG. 4, but with the lenses separated for maximum efficiency, i.e. the lenses collect all radiation entering the dielectric from the LEDs. The radius of a circular contour of a lens depends on the distance between the lens and the central lens 501. For maximum efficiency, gaps between lenses are unavoidable. In general when there is an SCO device following the PSC, the brightness of the rays exiting the SCO is diluted from the brightness of the rays exiting the PSC because of these gaps.

Figure 6:
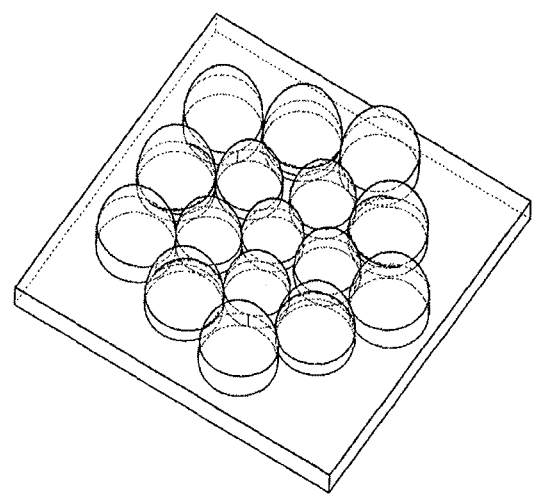
FIG. 6 shows a perspective view of the lens array of FIG. 5.

FIG. 6 shows a perspective view of the lens array of FIG. 5.

Figure 7:
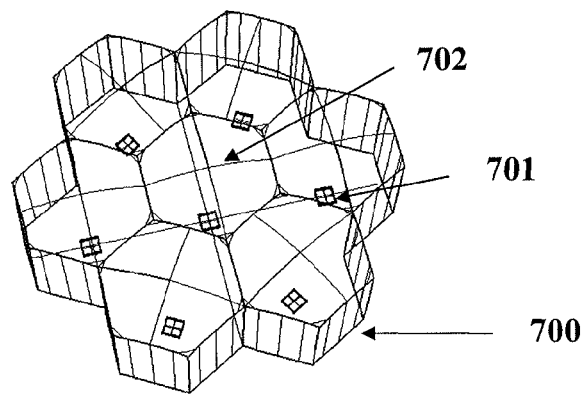
FIG. 7 shows a hexagonal lens array PSC, manufactured on a single piece of dielectric, with an air gap between the PSC and the LED array.

FIG. 7 shows a hexagonal lens array PSC 700, manufactured on a single dielectric piece, placed on top of its corresponding LED array 701 and with an air gap between the LED emitting surfaces and the PSC dielectric. The lenses are closely packed for higher average radiance. Because of the close-packing, some rays emitted by the LEDs do not reach their corresponding lens, but cross into an adjoining lens. In general, such rays are lost, causing a decrease in efficiency. The LED emission gives a spot on the upper lens surface that is close to having rotational symmetry whereas the lens contour is usually hexagonal (as shown in FIG. 7) or square. Because of this mismatch in geometry as well as higher Fresnel reflection losses for oblique rays, the illuminance at the exit of the PSC 702 is not constant, and may show undesirable artifacts.

FIG. 8 shows a PSC 801 followed by a kaleidoscope section 802. The illuminance becomes more uniform, the further away the exit plane 803 of the kaleidoscope is from the PSC. Also shown are the mirror walls 804 of the kaleidoscope 802. For the same uniformity level, higher values of the emission angle α allow for shorter kaleidoscope sections. The kaleidoscope can also be made of a dielectric prism without mirrors. In this case, reflections from the walls are achieved by total internal reflection.

Figure 9:
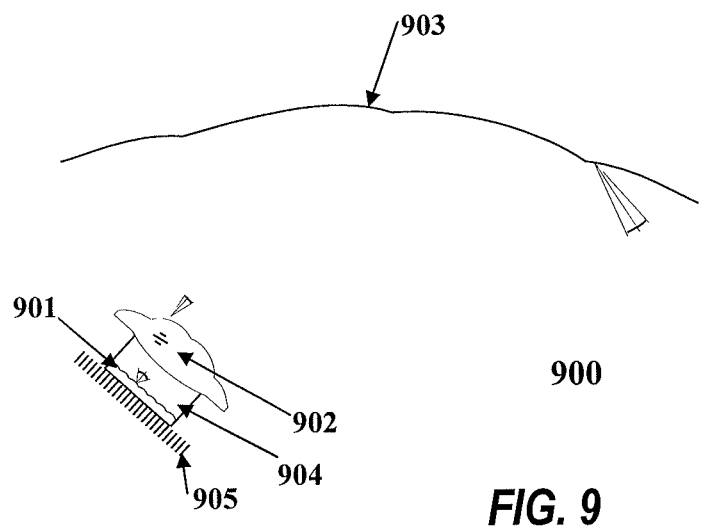
FIG. 9 shows a cross section of a luminaire with a PSC followed by a kaleidoscope, and a primary and a secondary optics for the SCOs. The primary and secondary optics of the SCO form a Kohler integrator array configuration which is shown by the lenticulations on both the primary and the secondary optics.

FIG. 9 shows a PSC 901 followed by a kaleidoscope section 904 and a two-element SCO, composed of a primary lens 902 and a secondary mirror 903 that are in Kohler integrator array configuration. Both the Kaleidoscope and the Kohler integrator array provide mixing without increasing etendue. Also shown is the heatsink 905.

Figure 10:
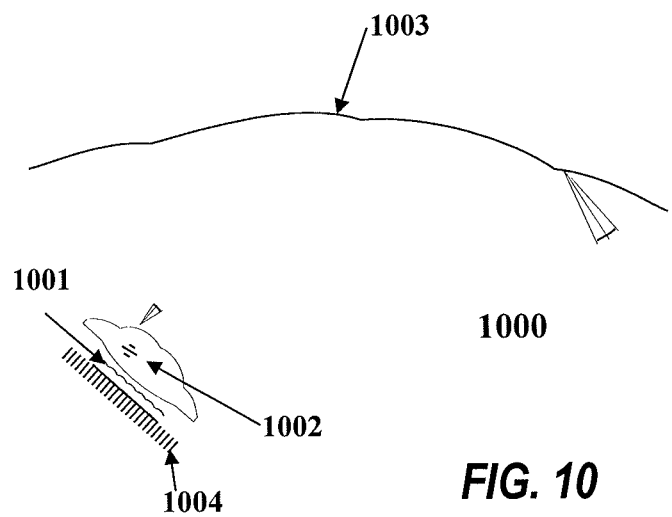
FIG. 10 shows a cross section of a luminaire with a Kohler integrator array configuration for the primary and secondary optics of the SCO but without a kaleidoscope following the PSC.

FIG. 10 shows the same system as in FIG. 9 with a PSC 1001 but without the kaleidoscope section. In general, the kaleidoscope is not needed when the SCO is in a Kohler integrator configuration, 1002 and 1003. Also shown is the heatsink 1004.

Figure 11:
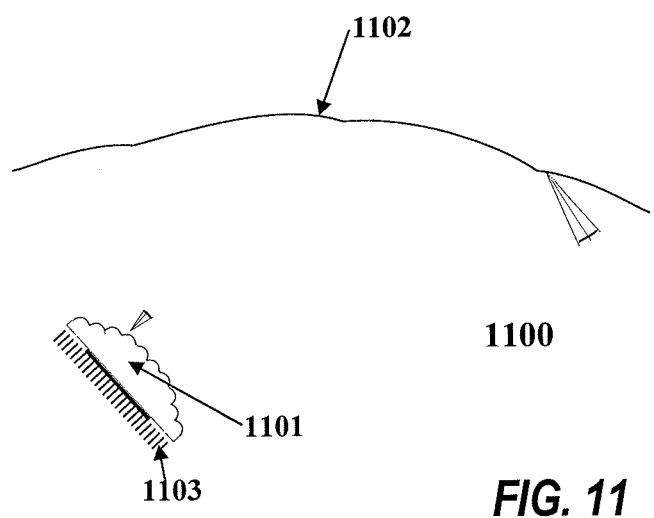
FIG. 11 shows a cross section of a luminaire with a PSC integrated into the primary optic of the SCO. The number of lenticulations on the primary optics coincides with the number of LEDs while the number of lenticulations on the secondary corresponds to the Kohler array configuration and can be different.

FIG. 11 shows that an additional simplification may be achieved by integrating the PSC as part of the primary optic 1101 of the SCO. Its feasibility is dependent on the luminaire intensity pattern. The number of lenticulations on the primary optics coincides with the number of LEDs while the number of lenticulations on the secondary 1102 corresponds to the Kohler array configuration and can be different.

The preceding description of the presently contemplated best mode of practicing the invention is not to be taken in a limiting sense, but is made merely for the purpose of describing certain general principles of the invention. The full scope of the invention should be determined with reference to the Claims.

We claim:

1. An optical system comprising:
an array of light sources or sinks;
an array of optical components, each aligned with a respective one of the array of light sources or sinks;
wherein the array of optical components acts as a phase space combiner for light from or to the array of light sources or sinks, forming a single connected region so that that any ray in the region can be transformed smoothly into any other ray in the region with every intermediate position in the transformation also being a ray in the region; and
wherein every light ray from or to one of the array of sources or sinks passing through the respective said optical component undergoes a maximum of one reflection at a reflective surface.

2. The optical system of claim 1, wherein the light rays from or to the array of sources or sinks passing through the respective said optical components do not undergo reflection at a reflective surface.

3. The optical system of claim 2, wherein the array of optical components is an array of lenses.

4. The optical system of claim 1, wherein said array of optical components is formed at least in part by a transparent medium bounded on a side towards the array of light sources or sinks by an interface with a medium of lower refractive index, whereby light rays from the array of sources enter the array of optical components or light rays to the array of sinks leave the array in directions limited by a critical angle of refraction at said interface.

5. The optical system of claim 1, further comprising an optics common to the optical components of said array and receiving light from or to said phase space combiner.

6. The optical system of claim 5, wherein said common optics comprises a Köhler integrator in which a first optical element images a source onto a second optical element, and the second optical element images the first optical element onto a target.

7. The optical system of claim 6, wherein said common optics comprises an array of Köhler integrators that are not aligned in a one-to-one or one-to many relationship with said array of optical components.

8. The optical system of claim 5, wherein said common optics comprises a kaleidoscope.

9. The optical system of claim 1, wherein the array of light sources or sinks is an array of electro-optical elements, each on an optical axis of a respective one of the array of optical components.

10. An optical system comprising:
   a plurality of light sources;
   a Phase-space Combiner (PSC) that combines the disconnected ray bundles from the said light sources into a single connected ray bundle so that any ray in the single connected ray bundle can be transformed smoothly into any other ray in the single connected ray bundle with every intermediate position in the transformation also being a ray in the single connected ray bundle; and
   a Single Common Optics (SCO) comprising an optical element or a sequence of optical elements that processes the light from the said PSC.

11. The optical system of claim 10, wherein the said PSC is a lens array.

12. The optical system of claim 11, wherein the said lens array PSC comprises free-form lenses with non-constant pitch between lenses.

13. The optical system of claim 10, with a kaleidoscope following the said PSC.

14. The optical system of claim 10, wherein the SCO comprises optical elements that are in Kohler integrator array configuration.

15. The optical system of claim 10, wherein the PSC is integrated into the primary optical element of the SCO.

* * * * *